June 13, 1967 M. V. JOHNSON, JR., ETAL 3,324,623
PACKING APPARATUS
Filed Feb. 28, 1964 10 Sheets-Sheet 1

MAURICE V. JOHNSON, JR.
WAYNE E. ZWIACHER
ALFRED H. FENNELL
INVENTORS.

BY Paul A. Weilein
ATTORNEY

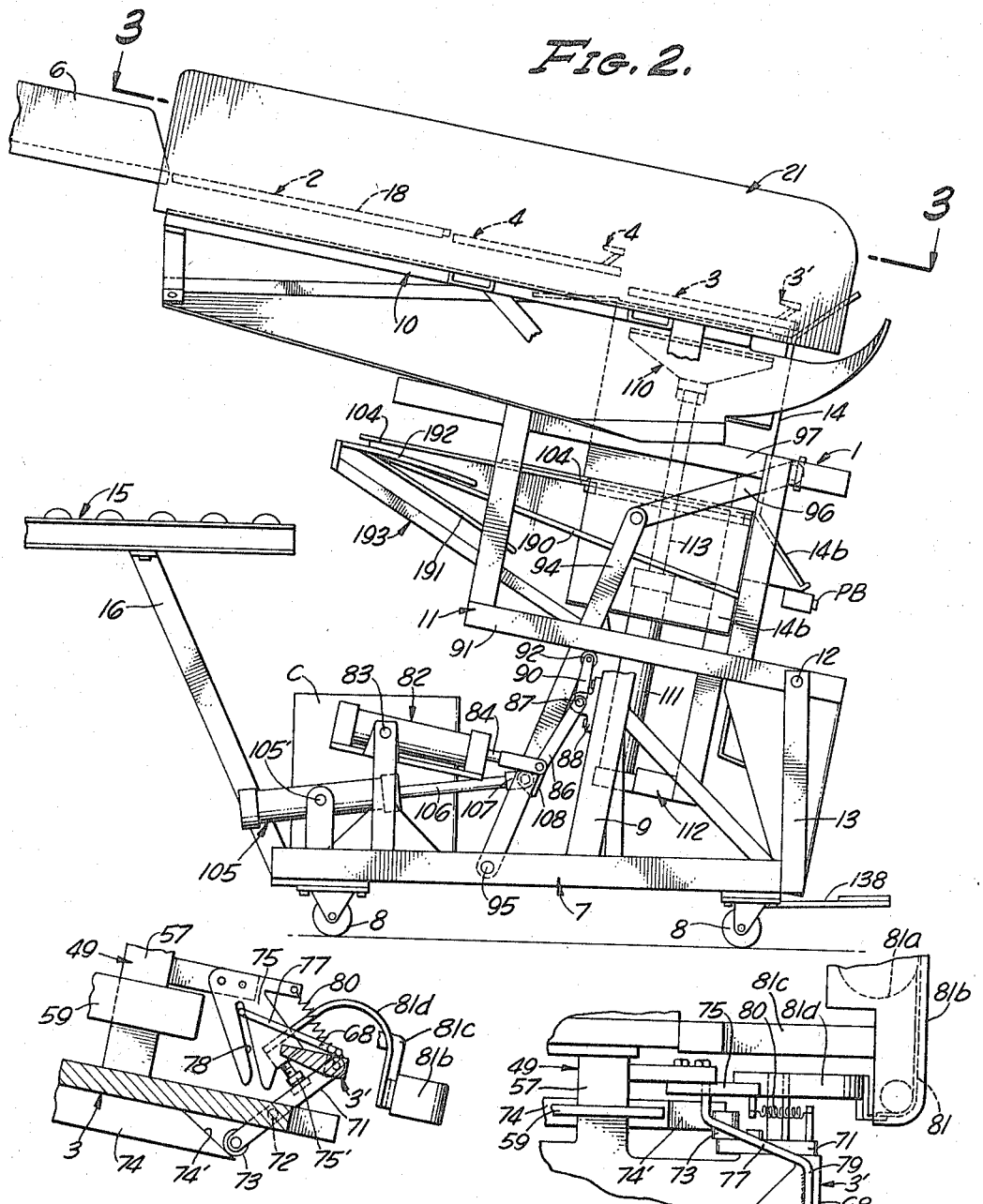

MAURICE V. JOHNSON, JR.
WAYNE E. ZWIACHER
ALFRED H. FENNELL
INVENTORS.

BY Paul A. Weilein
ATTORNEY

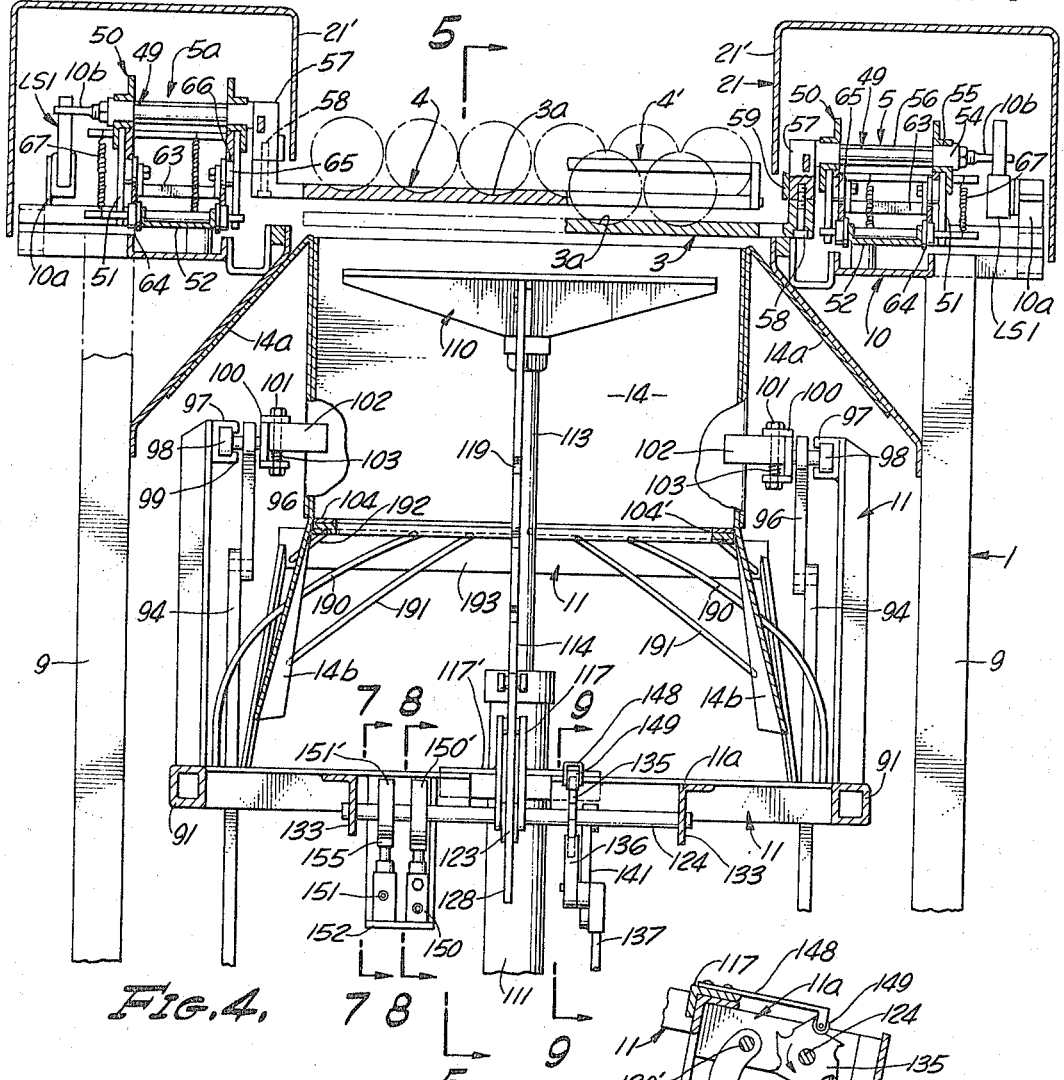

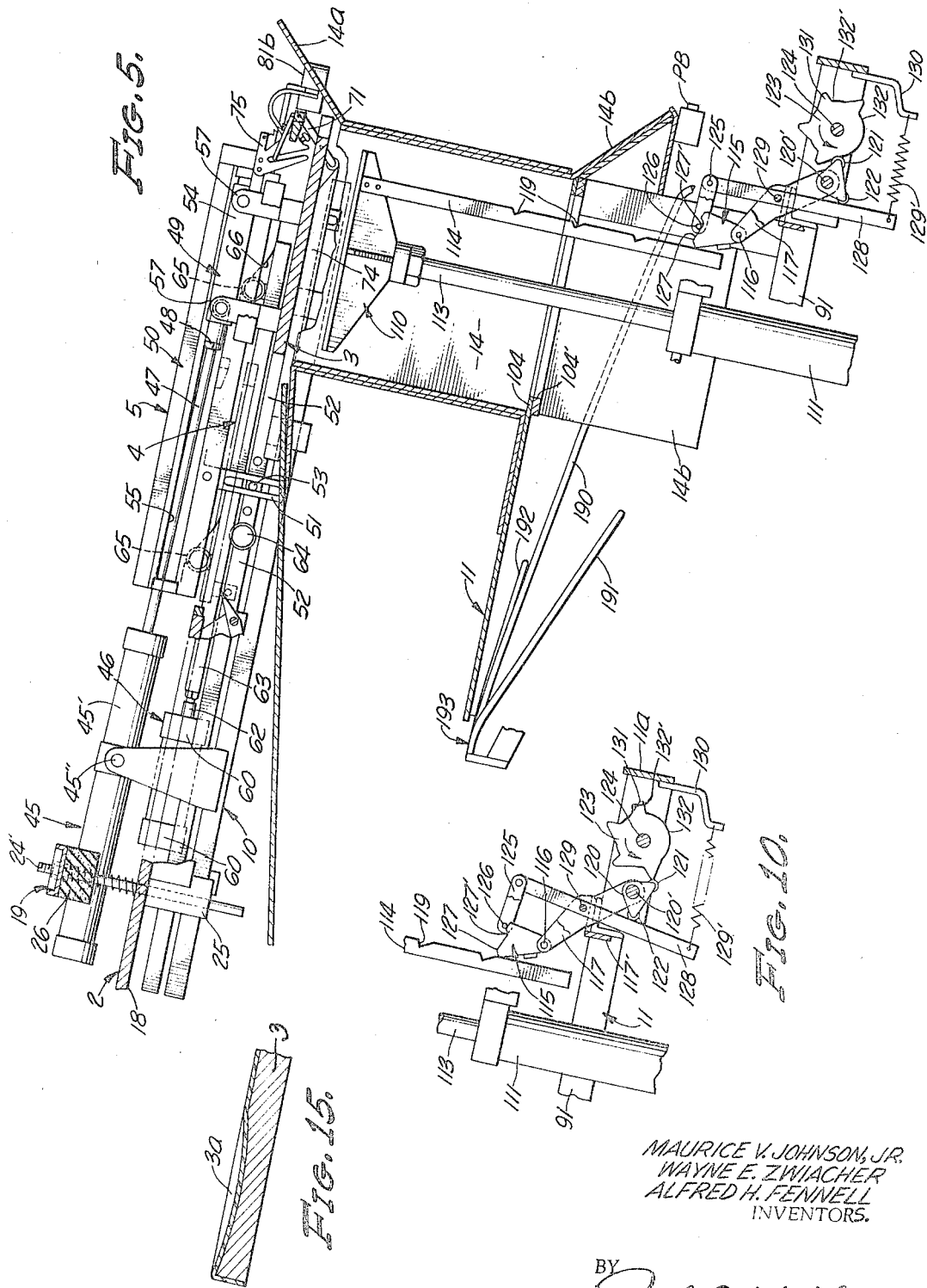

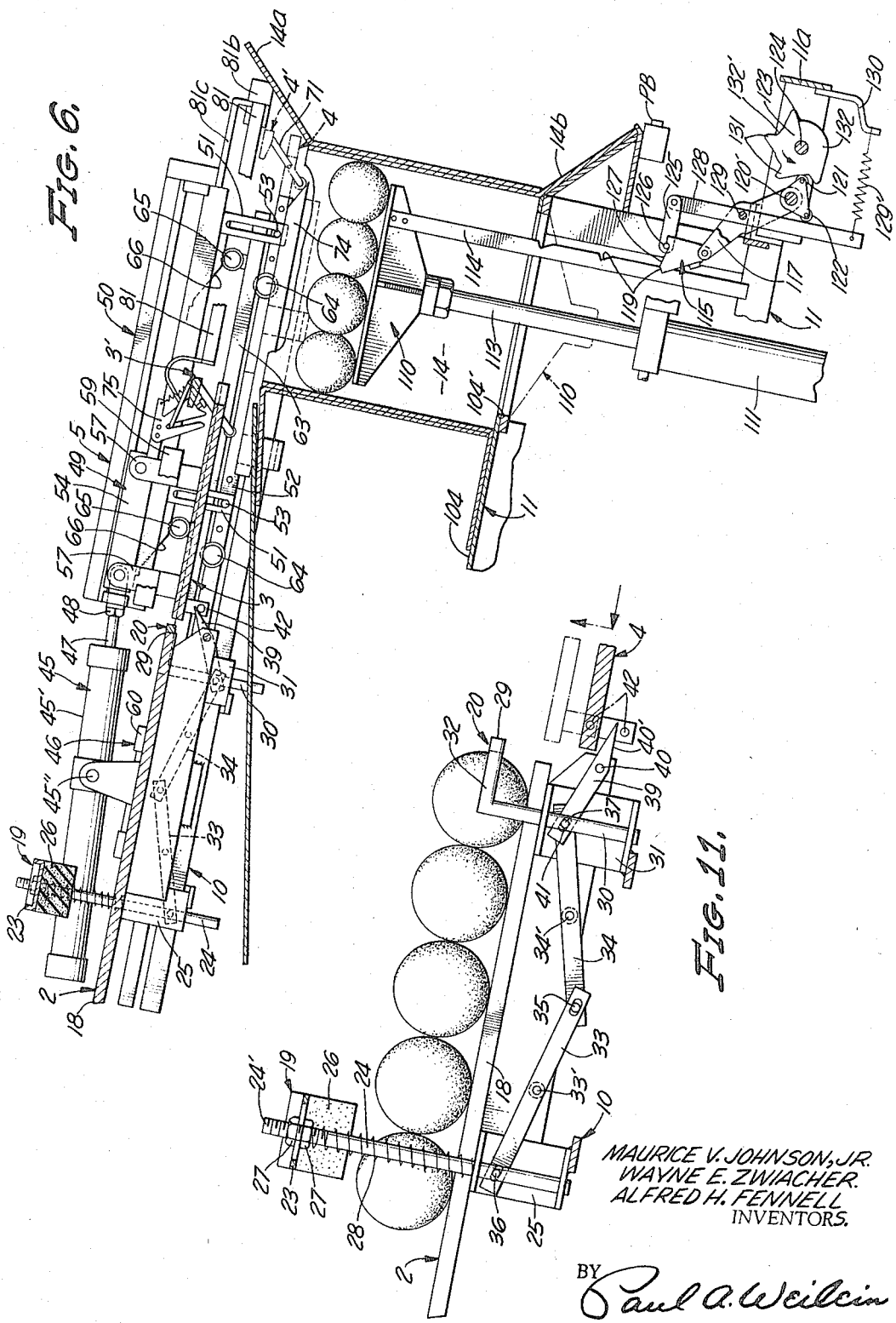

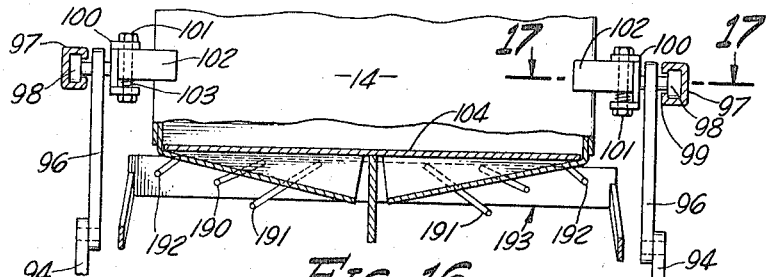
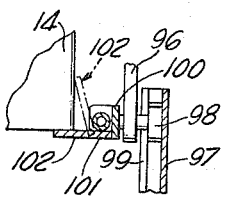
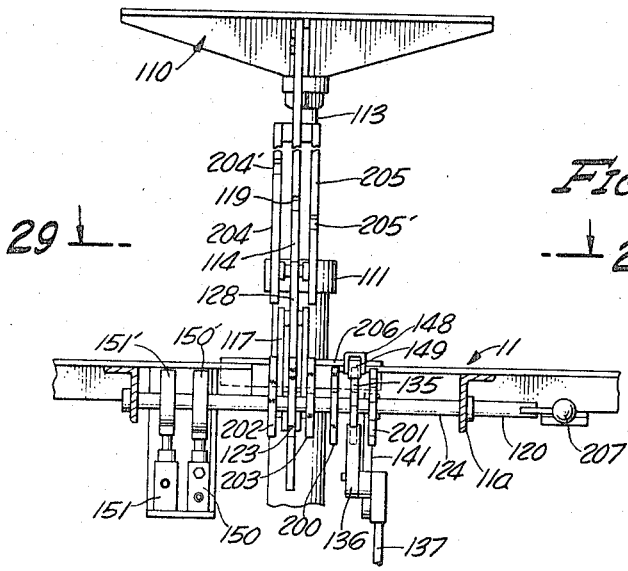
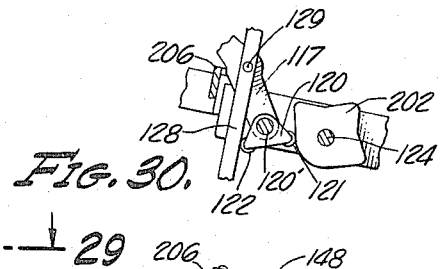
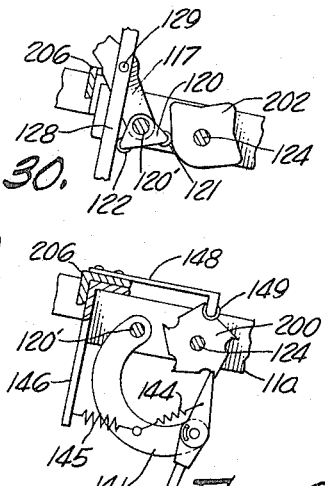
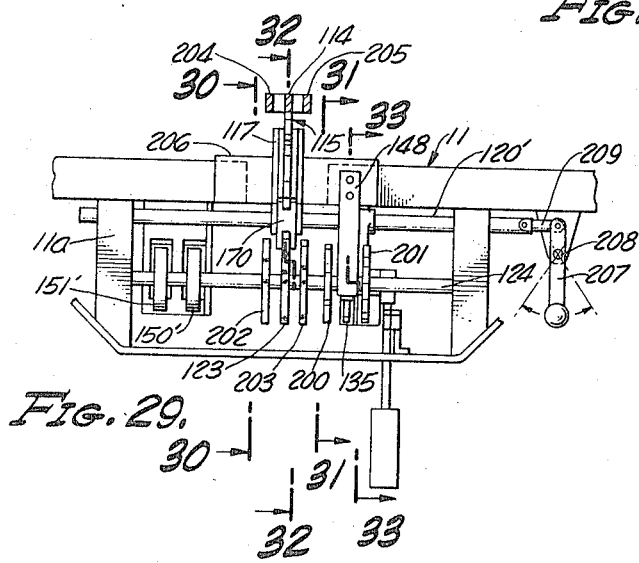
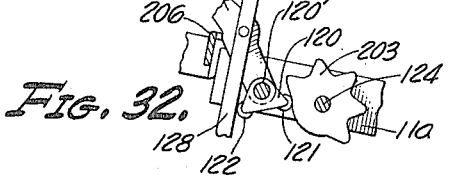
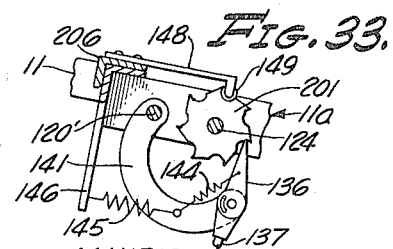
MAURICE V. JOHNSON, JR.
WAYNE E. ZWIACHER
ALFRED H. FENNELL
INVENTORS.
BY Paul A. Weilein
ATTORNEY

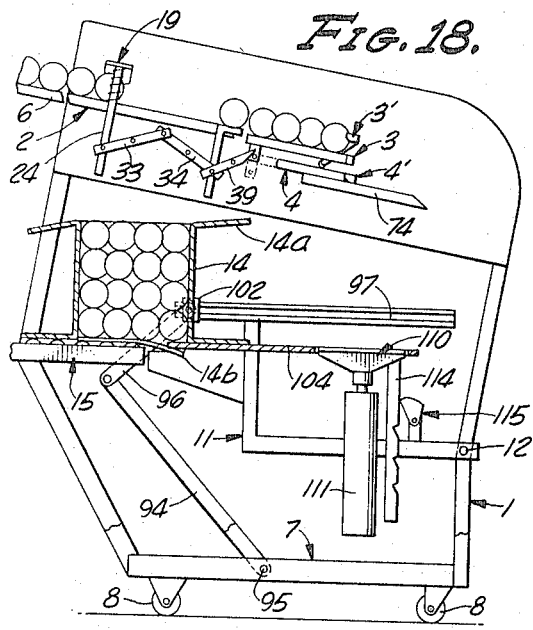
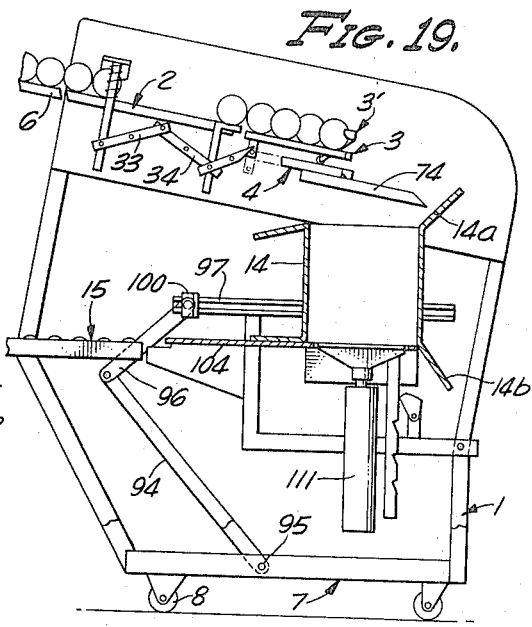
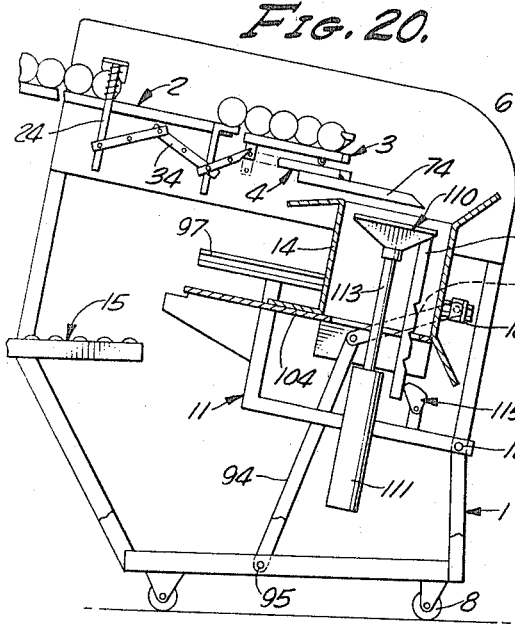
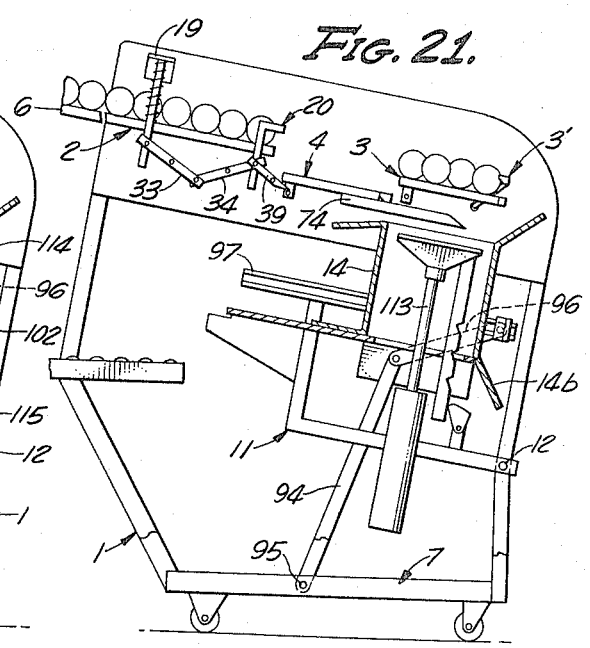

June 13, 1967  M. V. JOHNSON, JR., ETAL  3,324,623
PACKING APPARATUS
Filed Feb. 28, 1964
10 Sheets-Sheet 9
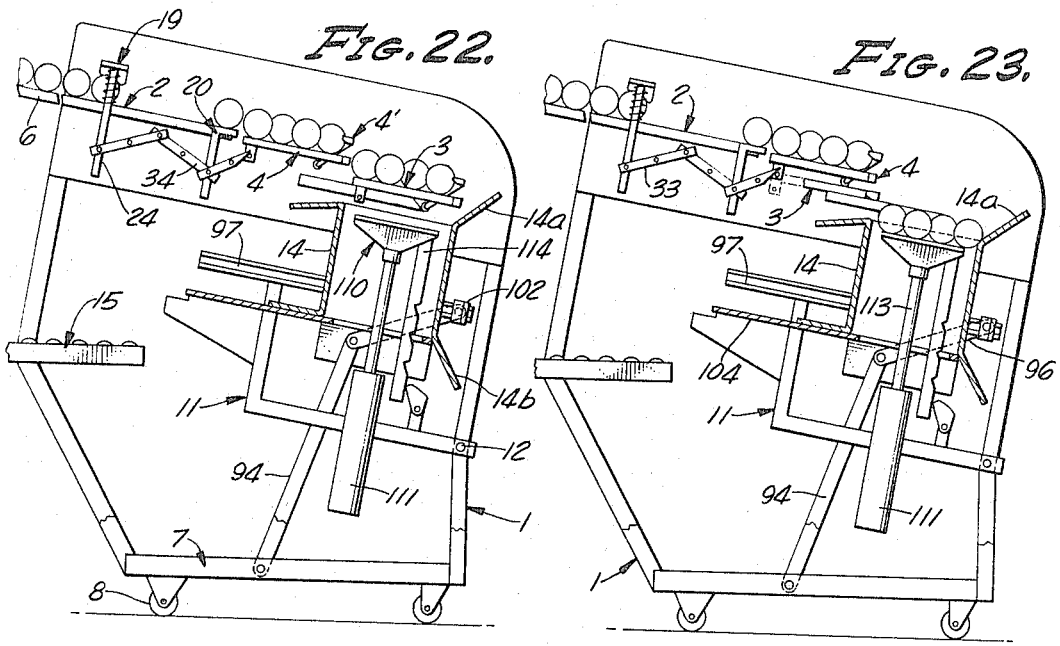
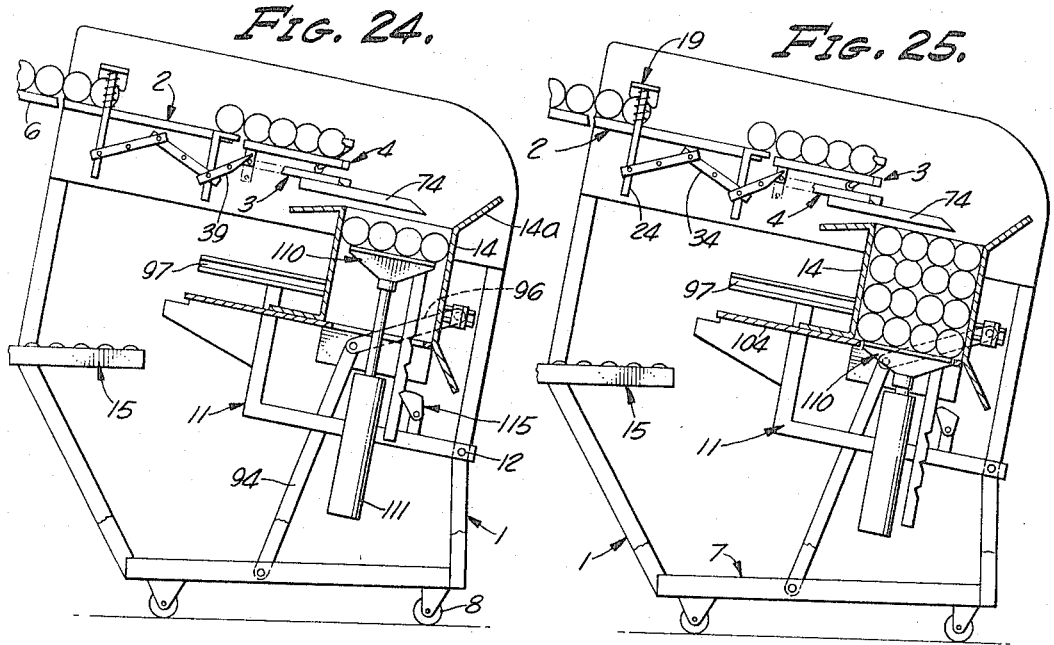
MAURICE V. JOHNSON, JR.
WAYNE E. ZWIACHER
ALFRED H. FENNELL
INVENTORS.
BY Paul A. Weilein
ATTORNEY June 13, 1967   M. V. JOHNSON, JR., ETAL   3,324,623
PACKING APPARATUS
Filed Feb. 28, 1964   10 Sheets-Sheet 10

MAURICE V. JOHNSON, JR.
WAYNE E. ZWIACHER
ALFRED H. FENNELL
INVENTORS.

BY Paul A. Weilein
ATTORNEY

United States Patent Office 3,324,623
Patented June 13, 1967

3,324,623
PACKING APPARATUS
Maurice V. Johnson, Jr., Upland, Wayne E. Zwiacher, Ontario, and Alfred H. Fennell, Chino, Calif., assignors to Sunkist Growers, Inc., Los Angeles, Calif., a corporation of California
Filed Feb. 28, 1964, Ser. No. 348,017
24 Claims. (Cl. 53—163)

This invention relates to an improved fruit packing apparatus for packing citrus fruits in cartons, but which also may be employed for packing other fruits as well as vegetables and other objects.

It is the present packing house practice to pack fruit, particularly citrus fruit, in fiberboard cartons of a given size with each carton containing an orderly arrangement of fruit of substantially the same size. It is desired to pack the fruit in layers arranged one above the other with the fruit of each layer disposed in rows in an amount which varies per row according to the particular size of the fruit being packed.

In the hand packing of fruit in cartons in the manner above noted, a desired uniformity and orderliness of the pack is usually achieved, but such packing requires the services of a number of experienced operators and, therefore, entails higher packing cost per carton than would be the case if by means of a machine a single inexperienced operator could operate the machine to achieve the desired results of hand packing.

Machines and apparatus therefor employed for packing citrus fruit in cartons have not been free from the objection of causing an undesirable amount of bruising and injury of the fruit. Moreover, such machines and apparatus are usually large, cumbersome, and costly as to construction and operation, since the services of a number of experienced operators are required with such machines and apparatus best to operate them.

It is also an object of this invention to provide a fruit packing machine that is compact, comparatively small as to size in consideration of its packing capacity per unit of time, and embodies a novel construction whereby it may be operated and controlled by a single inexperienced operator to pack the fruit in cartons in an orderly arrangement, minimizing injury of the fruit and affording advantages of hand packing without, however, entailing the labor costs and amount of time required in hand packing operations.

It is another object of this invention to achieve the above and other objectives herein noted by means of a fruit packing machine which includes a novel construction and arrangement of fruit carriers and operating means therefor wherein each carrier has a surface onto which is fed a given quantity of fruit of uniform size in rows to define a layer of a size to fit in a carton and wherein the operating means is operable to move the carriers between loading and discharging positions, with each carrier being actuated to release the layer of fruit thereon into the carton when in discharging position and thereafter being returned to loading position. These movements and operations of the carriers are effected upon manipulation of suitable controls by a single operator so that repeated delivery of layers of fruit to the cartons may be brought about as required to fill the cartons.

A further object is to provide in a machine of the character described a novel means for controlling the gravitational delivery of layers of fruit from the fruit carriers in a manner to assure that injury of the fruit is minimized and the desired uniform stacking of the layers is effected in each carton.

Another object of the invention is to provide in machines such as above described a novel means for closing the flaps of each loaded carton in the operation of moving the carton from the machine.

Other objects and advantages of the invention will be hereinafter described or will become apparent to those skilled in the art, and the novel features of the invention will be defined in the appended claims.

Referring to the drawings:

FIG. 2 is a view corresponding to FIG. 1 with parts of the machine moved to a different position from that shown in FIG. 1;

FIG. 4 is a fragmentary transverse sectional view taken substantially on the line 4—4 of FIG. 3;

FIG. 5 is a fragmentary sectional view taken on the line 5—5 of FIG. 4 showing a carton in position to have fruit deposited therein;

FIG. 6 is a view corresponding to FIG. 5 showing the carton as it would appear with a row of fruit therein;

FIG. 7 is a fragmentary sectional view taken on the line 7—7 of FIG. 4;

FIG. 8 is a fragmentary sectional view taken on the line 8—8 of FIG. 4;

FIG. 9 is a fragmentary sectional view taken on the line 9—9 of FIG. 4 on an enlarged scale;

FIG. 10 is a fragmentary side elevational and part sectional view of the mechanism shown at the lower right hand portion of FIG. 5 as it would appear in a different operative position than shown in FIG. 5;

FIG. 11 is a fragmentary part elevational and part sectional view on an enlarged scale of the gate means and actuating means therefor shown in FIGS. 5 and 6 for controlling feed of fruit to the plate-like movable fruit carriers;

FIG. 12 is a fragmentary sectional view taken on the line 12—12 of FIG. 3 of gate means and actuating means therefor as provided on each of the movable fruit carriers with the gate means closed;

FIG. 13 is a top plan view of the structure shown in FIG. 12;

FIG. 15 is a fragmentary sectional view of a part of one of the movable fruit carriers showing one of the depressions therein for retaining fruit thereon;

FIG. 16 is a fragmentary sectional view taken on the line 16—16 of FIG. 1;

FIG. 17 is a fragmentary sectional view taken on the line 17—17 of FIG. 16;

FIG. 18 is a schematic part sectional and part elevational view as it would appear in discharging therefrom a carton filled with fruit;

FIG. 19 is a schematic view corresponding to FIG. 18 of the machine as it would appear at the start of an operation to deposit fruit into a carton;

FIG. 20 is a schematic view corresponding to FIG. 19 showing the carton supports tilted to dispose the carton in fruit receiving position;

FIG. 21 is a view corresponding to FIG. 20 showing one of the fruit carriers with fruit thereon disposed over the carton preliminary to being lowered to fruit discharging position;

FIG. 22 is a schematic view corresponding to FIG. 21 showing a fruit carrier with fruit thereon in the lowered position in which it is actuated for dropping the fruit into the carton;

FIG. 23 is a schematic view corresponding to FIG. 22 showing the initial layer of fruit deposited in the carton and one of the fruit carriers in loading position with fruit thereon;

FIG. 24 is a schematic view corresponding to FIG. 23 showing the platen in the carton with fruit thereon in a lowered position to make room for the next layer of fruit;

FIG. 25 is a schematic view corresponding to FIG. 24 showing the machine as it would appear when a carton is filled with fruit preliminary to having the filled carton tilted for discharge from the machine as shown in FIG. 18;

FIG. 28 is a fragmentary part elevational and part sectional view of a modified form of the adjusting means for adjusting the fruit supporting platen in each carton during a filling operation;

FIG. 29 is a sectional view taken on the line 29—29 of FIG. 28;

FIG. 30 is a fragmentary sectional view taken on the line 30—30 of FIG. 29;

FIG. 31 is a fragmentary sectional view taken on the line 31—31 of FIG. 29;

FIG. 32 is a fragmentary sectional view on the line 32—32 of FIG. 29; and

FIG. 33 is a fragmentary sectional view taken on the line 33—33 of FIG. 29.

Figure 1:
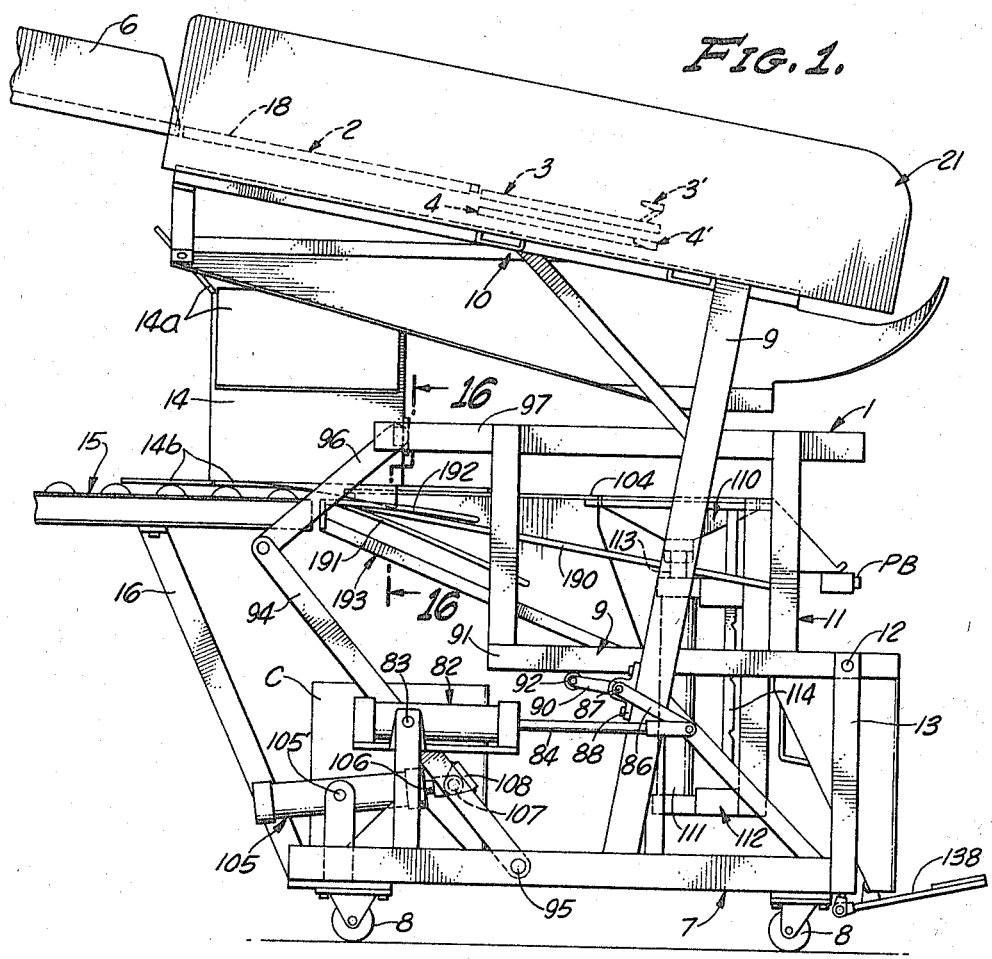
FIG. 1 is a side elevation of a fruit packing machine embodying the present invention.

As shown in the accompanying drawings, a fruit packing machine embodying this invention generally comprises a frame 1 supporting thereon fruit feeding means 2, a plurality of shiftable fruit carriers generally designated 3 and 4 and operating means 5 and 5a for moving the carriers between a loading position at which the fruit is fed thereon from the feeding means 2 and a discharge position where the carriers are further moved in a manner causing the fruit thereon to be discharged into suitable receptacles such as cartons.

Each of the carriers 3 and 4 in this instance is in the form of a rectangular plate or board having an upper surface which may be formed with rows of fruit-receiving depressions 3a for supporting a given amount of fruit of a given uniform size in rows forming a layer of fruit of a size to fit in the carton and so that successive layers will be disposed one above the other in the finished package. In instances where the carriers have the depressions 3a, carriers having depressions spaced and suited for fruit of different uniform sizes may be substituted for those not suited.

Figure 3:
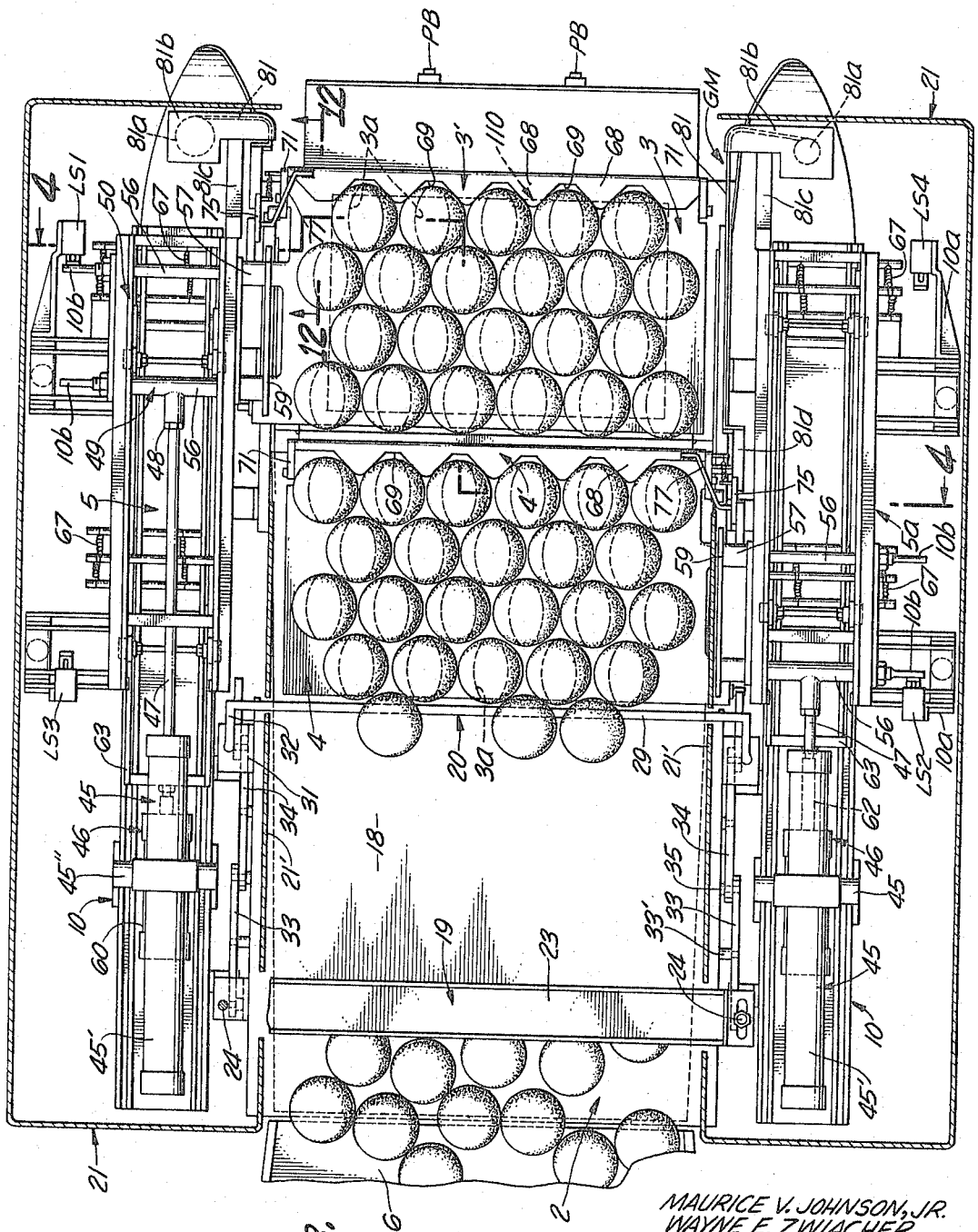
FIG. 3 is a top plan view taken on the line 3—3 of FIG. 2 on an enlarged scale and omitting the covers or shields shown in FIG. 2, for clarity of illustration.

In the present embodiment of this invention the machine is compact and portable in order that it may be positioned to receive fruit from a suitable source, for example, from the discharge chute 6 as shown in FIGS. 1 and 3 of fruit sizing apparatus, not shown. Accordingly, the frame 1 includes a rectangular base 7 mounted on rollers 8 and provided with upright members 9 supporting an upper frame section 10. This upper frame section, as shown in FIGS. 1 and 2, is inclined and supports the feeding means 2 and the fruit carriers 3 and 4 at such an inclination that fruit will gravitate from the feed means onto the carriers. The carriers 3 and 4 are provided with gate means 3' and 4' which releasably hold the fruit on the carriers and are actuated to release the fruit when the carriers are retracted from discharge position, in a manner to be hereinafter described.

A tiltable receptacle supporting frame section 11 is pivotally mounted as at 12 on upright portions 13 of the base 7. Cartons or similar receptacles such as the carton 14 shown in FIGS. 1 and 2 may be supported on the section 11 which may be tilted from the position in which the carton is loaded as shown in FIG. 2 to the position shown in FIG. 1 where the filled carton may be pushed forwardly from the frame 11 onto a roller take-off conveyor 15 connected to the frame 1 by means of upright supports 16.

Suitable means to be hereinafter described provides for the tilting of the receptacle supporting frame 11 between the position shown in FIGS. 1 and 2. Moreover, suitable means also to be hereinafter described are provided in cooperation with the frame 11 and carton to reduce the length of drop of the fruit from the carriers into the carton and to assure that the fruit will be properly stacked in rows when loaded in the carton. In addition to the means for controlling the packing of the fruit in the cartons, means to be hereinafter described are provided for closing the top and bottom flaps of the carton as the carton is moved onto the discharge conveyor 15.

Referring more specifically to the machine, it will be seen that the fruit feeding means 2, as shown in FIGS. 1, 3, 6, and 11, gravitationally feeds fruit onto the carriers 3 and 4 and includes a stationary feedboard or platform 18 of rectangular form mounted in an inclined position on the upper frame section 10 of the frame 1. At its upper and lower ends the platform 18 is provided with gates 19 and 20. When the gate 19 is closed, as shown in FIG. 3, fruit will be held against discharging from the chute 6 onto the platform 18. However, when gate 19 is opened, the fruit will gravitate onto the platform 18 and come to rest against the lower gate 20 which is closed while the gate 19 is open.

Fruit is prevented from rolling off the sides of the platform 18 by means of the guard covers 21 which enclose the upper portions of the operating means 5 disposed along opposite sides of the machine. Side walls 21' of these covers extend close to the sides of the platform and thus retain the fruit thereon.

When the lower gate 20 is open and the upper gate 19 is closed, fruit will roll from the platform 18 on to the carrier then disposed in loading position in an amount sufficient to fill the carrier. With this arrangement, each carrier is loaded with a predetermined amount of fruit depending upon the size of the fruit and the size of the carrier, each time the gates 19 and 20 are actuated as above stated.

The upper gate 19, as shown in FIGS. 3, 6, and 11, include a metal bar 23 extending across the upper end of the platform 18 and supported at its ends on upright rods 24, the latter being vertically adjustably mounted on brackets 25 secured to the upper frame section 10. The soft rubber strip 26 is fixed to the lower side of the bar 23 so that when the gate is closed, this strip will have cushioned engagement with fruit on the platform 18 to arrest gravitational movement of the fruit without bruising thereof. The bar 23 is vertically adjustable on the threaded portions 24' of rods 24, being held in adjusted position by means of the nuts 27 so that the gate will be disposed to stop and release the fruit according to the size of the fruit being packed.

Springs 28 on the rods 24 bias the rods upwardly to hold the gate in elevated open position as shown in FIG. 11.

The lower gate 20 includes a bar 29 extending across the lower end of the platform 18 so as to be movable between the closed position above the platform as shown in FIG. 11 and the lowered open position as shown in FIG. 6. Vertically adjustable rods slidable in brackets 31 have forwardly extending portions 32 joined to the ends of the bar 29 for supporting the latter in its movement between closed and open positions.

The gates 19 and 20 are interconnected for simultaneous operation by means of a pair of levers 33 and 34 on each side of the platform 18 and somewhat below this platform. The levers 33 and 34 are pivoted between their ends as at 33' and 34' respectively, and are pivotally connected to one another as at 35. The lever 33 on each side of the platform 18 is pivoted as at 36 to the adjacent rod 24 for the gate 19, whereas the lever 34 on each side of the platform is pivoted as at 37 to the adjacent rod 30 for the gate 20.

As shown in FIG. 11, when the gate 19 is elevated by the springs 28 to open position, the levers 33 and 34 are rocked so that the gate 20 is moved into closed position. Movement of the gate 20 to open position, however, is effected, as will be hereinafter described, by movement of the carriers 3 and 4 into loading position. This action of the gates is effected by a pair of levers 39 pivoted between their ends on a rod 40 extended beneath and across the lower end of the platform 18. Each of the levers 39 is pivoted at one end as at 41 to the adjacent rod 30 and has its other end bevelled as at 40' and disposed to be engaged by pins 42 on the carriers 3 and 4. With this arrangement when one of the carriers moves from the retracted position shown in full lines in FIG. 11 to the loading position shown in FIG. 6, the pins 42 engage the levers 39 and rock them so that the rods 30 are moved to lower the lower gate 20. At the same time, the levers 33 and 34 are rocked to close the gate 19.

The operating means 5 and 5a for moving the carriers 3 and 4 between loading and discharging position is best shown in FIGS. 3 and 4 and consists of like units arranged so that the unit 5 on one side of the machine operates the carrier 3 while the unit 5a on the other side of the machine operates the carrier 4. Each of the operating units 5 and 5a includes a fluid pressure operated piston and cylinder assembly 45 for extending and retracting the associated carrier, also a fluid pressure operated piston and cylinder assembly 46 for lowering the carrier from extended position into discharging positions and for raising the carrier from retracted position to loading position, each assembly in the present instance being operated by compressed air.

As shown in FIGS. 3, 5, and 6, each piston and cylinder assembly 45 has its cylinder 45' pivoted as at 45" on frame section 10 so as to rock about a horizontal axis, with the piston rod 47 connected as at 48 to a carriage 49 longitudinally slidable in a lifting and lowering frame 50 vertically adjustably supported on the upper section 10 of the frame 1. Slotted arms 51 depend from the frame 50 and are slidably connected with a stationary track 52 on the upper frame section 10 for limited vertical movement by means of pins 53 on the track 52 extending through the slots in the arms 51. The carriage 49 includes side members 54 slidably mounted in slots 55 in the frame 50, and provided with cross members 56 to one of which, as shown in FIG. 3, the piston rod 47 is connected. Arms 57 depend from the ends of one side member 56, as shown in FIG. 4, and are detachably secured as at 58 to the adjacent end of the associated carrier, for example, the carrier 3 as shown in FIG. 6, it being noted that the other carrier 4 is also connected to the operating means 5a in the manner above noted. A bar 59 is mounted on the arms 57 to serve as a side wall preventing the fruit from rolling off the adjacent side of the carrier.

The purpose of the piston and cylinder assembly 45 and carriage 49 for each of the carriers 3 and 4 is first to advance the carriers one at a time in one plane from the loading position to a forward position over the carton to be filled with fruit. Thereafter, the advanced carrier is lowered to discharge position and the other carrier is elevated to loading position by the action of the raising and lowering assembly 46, and in the next operation the piston and cylinder assembly 45 is operated to retract the carrier in a plane below that in which the carrier was advanced from loading position to thereby release the fruit therefrom. After one of the carriers has been retracted as above stated, the piston and cylinder assemblies 45 and 46 may again be operated to advance, lower, and retract the other carrier, and the cyclical operations are repeated as required to fill the cartons with fruit.

Referring now to each raising and lowering assembly 46, it will be seen with reference to FIGS. 3, 4, 5 and 6, that the cylinder 60 thereof is supported on the upper frame 10 below the cylinder of the assembly 45 (see FIG. 5) and has its piston rod 62 connected with an elongated actuating member 63 slidable on rollers 64 on the track 52. The cylinder 60 is operable to move the actuating member 63 between positions for raising and lowering the frame 50 so that the associated carrier will be raised and lowered. This raising and lowering action is brought about by rollers 65 on the actuating member 63 moving into and from engagement with cam surfaces 66 on the frame 50. Movement of the frame 50 into its lower position is effective by retractile springs 67 which are connected between the stationary track 52 and frame 50 so as to bias the frame to the lower position.

The gates 3' and 4' on the carriers 3 and 4 are alike and each gate, as shown in FIGS. 3 and 4, includes a bar 68 arranged over the carrier and provided with corresponding fruit receiving notches or pockets 69, as best shown in FIG. 3, for forming an orderly row of fruit across the carrier. Also, it should be noted that the first row of fruit against the gate provides a row of depressions between the pieces of fruit in the row for forming the next row and this is true of each row of fruit on the carrier. The gate bars 68 forming the gates are replaceable as are the carriers 3 and 4, so that the carriers and bars will have depressions 3a and fruit receiving pockets 69, respectively, of the size and spacing to accommodate fruit of the particular size being packed by the machine. Where the fruit is smaller than here shown, the depressions 3a and the pockets 69 would be more closely spaced and therefore would provide for a greater number of rows per layer on each carrier.

Figure 14:
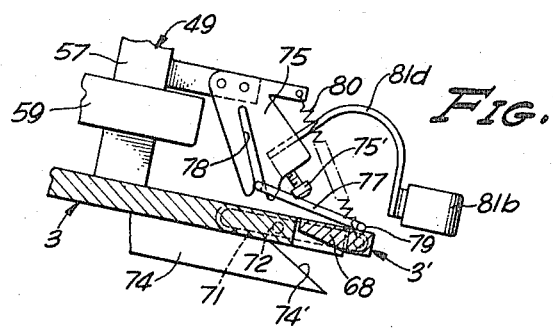
FIG. 14 is a view corresponding to FIG. 12 with the gate means in open position.

Means are provided for raising and lowering the gates 3' and 4' on the carriers 3 and 4 and, as shown in FIGS. 12, 13, and 14, includes on each gate levers 71 fulcrumed thereon as at 72 for supporting on the upper ends thereof the bar 68 which forms the gate, for example, the gate 3' for the carrier 3. On their opposite ends the levers 71 are provided with rollers 73 adapted to roll on a cam track 74 carried by the upper frame section 10. The cam track 74 has a bevelled end 74' on which the rollers 73 come to rest, as shown in FIG. 2, when the carrier is in discharging position.

A slotted guide bracket 75 is fixed on the carriage 49 for each of carriers 3 and 4 and receives a guide link 77 in the slot 78 of the bracket. This link is fixed to the gate as at 79 and guides the gate between the closed position shown in FIG. 12 and the open position shown in FIG. 14. The gate is biased by a spring 80 fastened at its ends to the lever 71 and to bracket 75 to hold the gate in up or closed position during the movement of the carrier from loading position to the lowered discharge position, the opening of the gate to release the fruit taking place only when the carrier is retracted from discharge position. An adjusting screw 75' is threaded onto the bracket 75 so as to abut the lever 71 as a stop to limit the raising movement of the lever so that the gate bar 68 may be disposed at different heights above the carrier for holding thereon fruit of different sizes. The opening of the gate is brought about by the rollers 73 riding up on the beveled end 74' of the track 74 and onto the track 74 proper when the carrier is retracted from discharging position, due to the lever 71 being rocked to lower the gate bar 68 in response to this movement of the rollers.

As shown in FIGS. 3 and 13, extensible gate means GM are provided to prevent the fruit from rolling off the sides of carriers 3 and 4 opposite the sides on which the side bars 59 are located, this means being operated while fruit is being fed onto the carriers and during movement of the carriers into and from extended and retracted positions. The gate means GM includes for each of the carriers a flexible tape 81 extensible from a spring-loaded reel 81a mounted in a housing 81b fixed to an extension 81c of the upper frame section 10. The outer end of each tape 81 as shown in FIGS. 12 and 13, is fixed to a bracket 81d carried by the carriage 49 for the associated carrier. The carrier 3, while being retracted, pulls out the tape 81 connected thereto so as to provide a gate for the carrier 4 and the carrier 4 likewise operates the other tape 81 for carrier 3, for example, the retracted carrier 4, as shown in FIG. 3, has pulled out the tape 81 attached thereto so that it will extend close along one side of the carrier 3 then in extended position, whereby the fruit is prevented from rolling off that side of carrier 3.

Means are provided for moving the tiltable carton supporting frame 11 between the upright position shown in FIG. 1 and rearwardly tilted position shown in FIG. 2, at which latter position the carton is disposed to receive the fruit released from the carriers. This tilting means, as shown in FIGS. 1 and 2, includes a piston and cylinder unit 82 pivoted as at 83 on the base 7 of the frame 1 with the piston rod 84 connected to a crank arm 86 fixed to a shaft 87 extending across the frame 1 and journalled in bearings 88 on the upright posts 9 of the frame 1. Crank arms 90 are fixed on the shaft 87 so that they are disposed beneath the like side members 91 of the tiltable frame 11. Rollers 92 are carried by the crank arms 90 so as to bear against the side members 91 to tilt the frame 11 between the unloading and loading positions shown in FIGS. 1 and 2 respectively, in response to retraction of the piston and cylinder unit 82.

Unloading means are provided for moving a loaded carton from the frame 11 onto the roller conveyor 15 when the frame 11 is returned to unloading position shown in FIGS. 1 and 18. This unloading means comprises a pair of upright levers 94 fulcrumed at their lower ends as at 95 on base 7 of the frame 1 and pivotally connected at their upper ends to links 96, which latter, as shown in FIGS. 16 and 17, are slidably connected with guide rails 97 disposed along opposite sides of the upper part of the tiltable frame 11.

Slide members 98 of non-circular cross section are fixed on the upper ends of the links 96 and are mounted on the guide rails 97 which are flanged at at 99 to hold the slide members for sliding movement on the rails. The levers 94 are arranged to swing between the rearwardly inclined position shown in FIG. 2 and the forwardly inclined position shown in FIG. 1 in moving a loaded carton from the frame 11 onto the conveyor 15. Accordingly, the levers 94 are provided at their upper ends, as shown in FIGS. 16 and 17, with brackets 100 on which are pivoted as at 101 carton-engaging members 102 biased by springs 103 to occupy the extended carton-engaging position shown in FIGS. 16 and 17. With this arrangement the spring-loaded member 102 will contact the back of a loaded carton while the latter is on the open and elongate carton-supporting shelf 104 on the tiltable frame 11, so as to push the carton off the shelf onto conveyor 15 in response to the forward swinging of the levers 94 as effected by actuation of a piston and cylinder unit 105 pivotally mounted as at 105' on the base 7 of frame 1. The piston rod 106 of the unit 105 is connected as at 107 with a cross member 108 extended between and connected with the levers 94 whereby the levers are subject to actuation by the unit 105. Upon actuation of this cylinder unit to return the levers 94 and pivoted carton-engaging members 102 to the position for engaging the next carton, the pivoted carton-engaging members 102 will engage the sides of the carton and swing to the dotted line position shown in FIG. 17. The member 102 will now slide along the sides of the carton to a position rearwardly of the carton where the springs 103 will bias the members 102 to engage the carton, as shown in FIGS. 16 and 17.

It should be noted that each carton is supported on the shelf 104 with its lower end open and disposed in registration with an opening 104' in the shelf for for the purpose of accommodating in the carton means operable for receiving fruit discharged from the carriers 3 and 4 so that the fruit will be deposited in the carton in uniform layers one atop the other without injury or being disarranged as layers from the order in which the layers were formed on the carriers before discharge therefrom. As here shown, this means includes platen 110 which is of a size somewhat comparable to that of each carrier and the carton, whereby it may be freely vertically moved in the carton. When disposed near the open top of the carton to receive the first layer of fruit, the platen 110 may be lowered successively for reception of the successive layers of fruit. In this manner the layers of ruit are supported by the platen until the carton is filled, at which time the platen 110 is disposed in the opening 104' of the shelf 104 so as to be level with the carton supporting surface of the shelf, whereby the filled carton may be pushed off the shelf onto the conveyor 15. In this connection, it should also be noted that as the carton is open at its upper and lower ends when mounted on the shelf 104 over the opening 104', the top closure flaps 14a and bottom closure flaps 14b of the carton are extended from the carton as shown in FIGS. 4 and 18 through 25, with a pair of the bottom flaps arranged so that they will be closed by means hereinafter described, while the carton is being pushed onto the conveyor 15.

As shown in FIGS. 1, 2, 4, and 5, the means for effecting movements of the platen 110 in the cartons includes a cylinder and piston unit 111 supported on a downward extension 112 of the tiltable frame 11 so that the unit 111 will be tilted with the tiltable frame. The piston rod 113 of the unit 111 supports the platen 110 in the carton, for example, as shown in FIG. 5. As here provided, the piston and cylinder unit 111 is operated to extend the platen through the open lower end of the carton to occupy the uppermost position therein, as shown in FIG. 5, and to hold the platen in that position until the first layer of fruit is deposited onto the platen. Thereafter, the platen 110 is lowered by manually operable means which includes a rack bar 114 (see FIGS. 5 and 10) fixed to and depending from the platen and a pawl 115 pivoted as at 116 on one end of a double arm 117 fixed as by welding in a slot in a member 117' mounted on the frame 11. The pawl 115 is mounted to gravitationally move into engagement with notches 119 in the rack bar 114. The arm 117 has its lower end disposed within a rectangular extension 11a of frame 11 and fixed to a shaft 120' supported on the extension frame 11a.

As shown in FIGS. 5 and 10, a rocker member 120 is pivoted on the lower end of the arm 117 and supports on opposite sides of its pivot a pair of rollers 121 and 122, the former of which is engageable with a cam 123 mounted on a shaft 124 operable in frame 11a for rotating the came wheel to control actuation of the pawl 115 with respect to the rack bar 114. Movement of the pawl 115 into and from engagement with the notches 119 in the rack bar 114 is controlled by a member 125 having a pin 126 thereon engageable in a depression 127 in the top of the pawl. The member 125 is mounted on the upper end of a lever 128 pivoted as at 129 on the fixed arm 117 with its lower end connected with a spring 129' connected to a downwardly extended arm 130 on the portion 11a of frame 11.

The cam wheel 123 is provided with four projections 131, a dwell portion 132, and dwell portions 132' between the projections. When the cam member 123 is rotated in a counterclockwise direction from the position shown in FIG. 5 with the dwell portion 132 bearing against roller 121 on the rocker member 120, the first projections 131 next above the roller 121 will engage this roller and thereby rock the rocker member 120 so that the other roller 122 will engage the lever 128 and rock it against the action of the spring 129' to lift pin 126 out of the depression 127 in the pawl 115 as shown in FIG. 10. This permits the pawl to gravitationally move to a position for engaging in the notches 119 in the rack bar 114. When the pin 126 is in this position it is still over the pawl 115 which is therefore prevented from moving forwardly past the position for engaging a notch 119 in the rack bar 114.

As shown in FIG. 5, while the platen 110 is in position to receive the first layer of fruit, the spring 129' biases the lever 128 to occupy a position in which the pawl 115 is ready to be actuated for engaging the first notch 119 in the rack bar 114 upon movement of the cam wheel into position shown in FIG. 10.

Following movement of the cam 123 sufficiently to dispose the roller 121 between the two projections 31 nearest to this roller, as shown in FIG. 6, the pawl 115 is disposed in a position engaging a notch 119 in the rack bar 114 for holding the platen 110 in position to receive the second layer of fruit deposited from the carriers 3 and 4.

After the second layer of fruit is positioned on the platen 110, as shown in FIG. 6, the next movement of the cam 123 to bring the projection 131 next above the roller 121 into engagement with that roller, will cause the lever 128 to be rocked in such a manner that the pin 126 will engage a shoulder 127' at one end of the depression 127 and thereby retract the pawl 115 from the notch 119 to permit the rack bar 114 to lower one notch and consequently lower the platen 110 accordingly. The cam 123 is successively operated so that the platen will be successfully lowered into four different positions to provide for four layers of fruit in the carton, as will be hereinafter described.

As shown in FIG. 4, the shaft 124 is supported in portions 133 on the extension 11a of the frame 11 and rotation thereof in a counterclockwise direction is effected by a pedal-operated ratchet mechanism 34, shown in FIG. 9 and which includes a ratchet wheel 135 mounted on the shaft 124 to one side of the rack bar 114 and pawl 115, as shown in FIG. 4. The ratchet wheel 135 is rotated by means of a pawl 136 pivoted on a link 137 actuated by a pedal 138 to move the pawl 136 against the ratchet wheel. The pedal 138 is fulcrumed as at 139 on a downwardly extended portion 140 of the frame section 11a and when depressed will move the link 137 upwardly and thereby move the pawl 136 for turning the ratchet wheel 135. An arcuate guide arm 141 is pivoted at one end on a shaft 120' supported on the frame extension 11a and also pivoted as at 143 to the pawl 136 and link 137 to guide the latter and the pawl 136 upon depressing the pedal. A spring 144 extending between the arm 141 and the pawl 136 biases the latter against the ratchet wheel 135. A similar spring 145 is connected to the arm 141 and to a part 146 of the frame 11 for urging the arm 141 in a direction maintaining the link 137 and pawl in position for operating the ratchet wheel 135 when the pedal 138 is depressed. The spring 145 also serves to return the link 137 and pawl to a position in which the pedal is elevated for actuation following release of the pedal after a depression thereon. A spring arm 148 is fixed at one end to the frame portion 11a and at its other end carries a detent roller 149 which bears against the ratchet wheel 135 to prevent retrograde movement thereof.

Means operable in response to actuation of the pedal 138 and rotation of the shaft 124, are provided for controlling the operation of the piston and cylinder unit 111 for elevating the platen 110 as well as for controlling the piston and cylinder units 82 and 105, which latter units respectively tilt the carton supporting frame 11 and actuate the levers 94 and fingers 102 for discharging a loaded box onto the conveyor 15. In the present instance this means includes a valve 150 for controlling flow of compressed air to the cylinder unit 111 for elevating the platen 110, also a valve 151 for controlling the flow of compressed air to the cylinder units 82 and 105 for tilting the frame 11 and for actuating the above noted means for moving the loaded carton onto the conveyor 15 respectively. These valves 150 and 151 are mounted on a bracket 152 depending from the frame 11 so that the valves are held in position to be actuated by cams 150' and 151' mounted to rotate with the shaft 124. The cam 150' has a projection 153 for engaging a plunger 154 on a valve 150 to actuate the later. The cam 151' has a single projection 155 engageable with a plunger 156 on the valve 151 for actuating the latter.

It should be noted that if a greater or lesser number of layers of fruit are to be packed in a carton due to the packing of fruit of different sizes than here shown, the carriers 3 and 4 with the gates 3' and 4' thereon, also the rack bar 114, cam 23, and ratchet wheel 135, must be changed to permit of operations of the machine as necessary to move the platen into the number of positions in the carton to accommodate the different number of layers of fruit.

Figure 26:
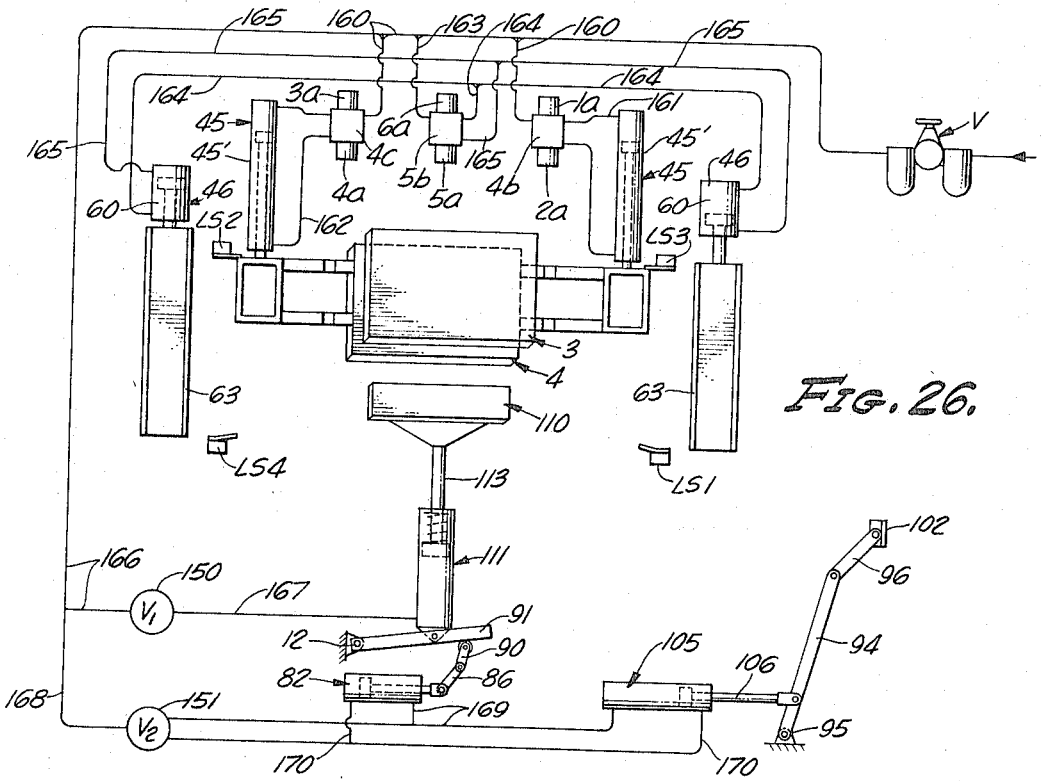
FIG. 26 is a diagrammatic view of the fluid pressure circuits and operating elements therein as embodied in the machine.

FIG. 26 illustrates schematically the compressed air circuitry and related electrical elements for the piston and cylinder units 45, 46, 82, 111, and 105, also the manner in which solenoids 1a and 2a control a valve 4b for the cylinder unit 45 that operates the carrier 3. The solenoids 3a and 4a control the valve 4c for the other cylinder unit 45 which operates the other carrier 4. Solenoids 5a and 6a control a valve 5b for the two cylinder units 46 that cause the carriers 3 and 4 to be lifted into loading position and lowered into discharging position. Limit switches LS1, LS2, LS3, and LS4 are actuated in response to the carriers reaching limits of their movements, so that the valve 5b will direct compressed air to control the operation of cylinder units 46 for lifting and lowering the carriers 3 and 4. The above noted limit switches, as will be seen in FIGS. 3 and 4, are mounted on brackets 10a on the upper frame section 10 in position to be actuated by projection 10b on the carriages 49 for the carriers 3 and 4, these projections and switches being disposed so that the switches are operated when the carriers reach the limits of their forward and rearward movements.

Compressed air from a source, not shown, passes through a valved regulator V and line 160 to each of the valves 4b and 4c and opposite ends of the cylinder 45'. A line 163 connects supply line 160 with the valve 5b which controls air flow to opposite ends of the two cylinders 60 of units 46 through flow lines 164 and 165. The manner in which the valves and compressed air operated units are operated and the sequence of such operations will be fully set forth hereafter in the description of the complete operation of the machine.

Referring again to FIG. 26, it is seen that the cylinder 111 for elevating the platen 110 is controlled by the valve 150 which is coupled to the air supply 160 by a line 166, there being a line 167 leading from the valve 150 to the cylinder 111.

The valve 151 controls operation of the cylinder 82 for tilting the carton supporting frame 11, also operation of the cylinder 105 for actuating the elements 94, 96, and 102 for pushing a loaded carton from the carton supporting frame 11. A line 168 leads from supply line 166 to the valve 151 from which latter lines 169 and 170 lead to cylinders 82 and 105 in the manner shown in FIG. 26. The valves 150 and 151, as hereinbefore described, are operated at will mechanically upon actuation of the pedal 139 and shaft 124 on which latter cams 105' and 151' control operation of valves 150 and 151.

Figure 27:
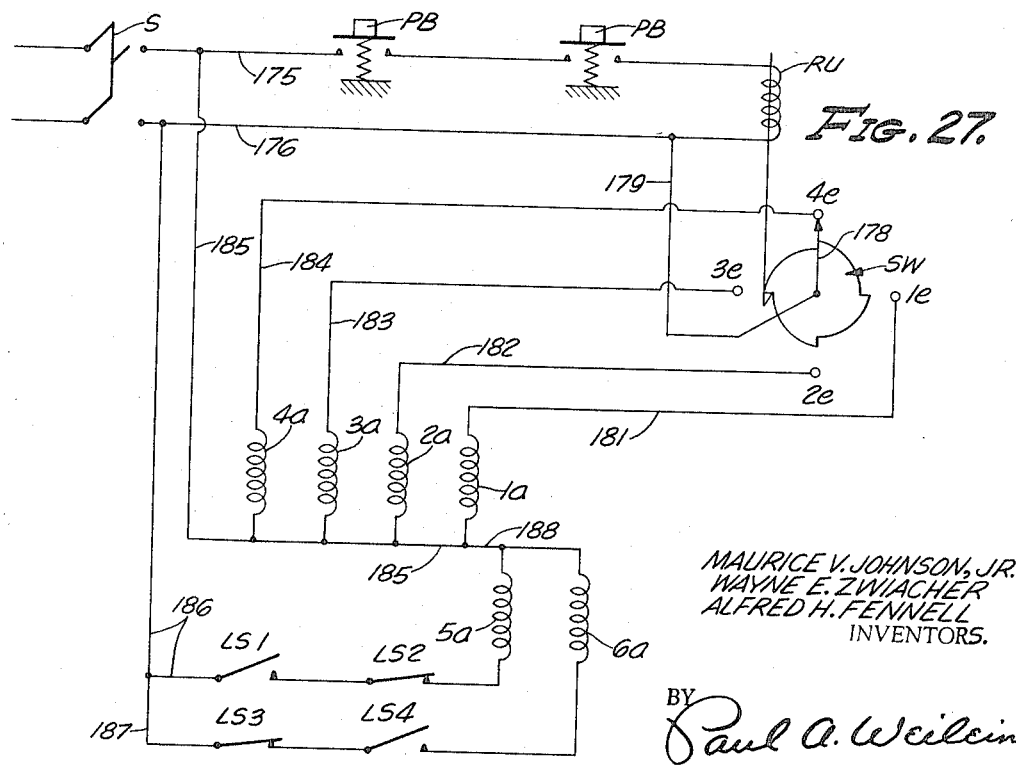
FIG. 27 is a diagrammatic view of the electrical circuits and associated elements embodied in the machine.

FIG. 27 illustrates the electrical circuits for a stepping switch unit SW which controls operation of the solenoids 1a, 2a, 3a, and 4a that operate valves 4b, 4c, and 5b, so that these valves may be operated in the desired sequence. The stepping switch SW is actuated by a solenoid operated ratchet unit RU in turn controlled by a pair of push button switches PB. A line switch S provides for electrically connecting conductors 175 and 176 with a source of electrical energy, not shown, the conductors 175 and 176 leading to the solenoid of the unit RU so that when both push button switches PB in the conductor 175 are closed, the stepping switch SW will be actuated to complete a circuit for one of the valve actuating solenoids 1a through 4a. Accordingly, the switch SW has four contact points 1e, 2e, 3e, and 4e, one of which is engageable by a movable circuit closing member 178 with each operation of the switch SW as effected by unit RU. The member 178 is connected by a conductor 179 to the conductor 176 while the contact points 1e through 4e are connected to one side of each of the solenoids 1a through 4a by means of conductors 181, 182, 183, and 184. The circuits for the solenoids 1a through 4a are completed by a conductor 185 leading from the conductor 175 to the other side of each solenoid.

Control of the solenoids 5a and 6a which actuate the valve 5b for controlling the cylinders 60 of the units 46 for raising and lowering the carriers 3 and 4 is effected by the limit switches LS1 through LS4. As shown in FIG. 27, switches LS1 and LS2 are connected in series in a conductor 186 leading from conductor 176 to one side of the solenoid 5a. A conductor 187 leads from conductor 186 to one side of solenoid 6a, the limit switches LS3 and LS4 being connected in series in conductor 187. The circuits for the solenoid 5a and 6a are complete through a conductor 188 leading from the conductor 185 to the other side of each of the solenoids 5a and 6a.

The two push button switches PB which are simultaneously closed to effect an operation of the solenoid actuated ratchet unit RU to actuate the stepping switch SW may be located as shown in FIGS. 1, 2, and 3 on a flat supporting extension 11b of frame 11 at the front of the machine. The reason for the two push button switches is to assure that the hands of the operator of the machine will be in a safe out-of-the-way position when the carriers are being moved in the operation of the machine, since it may sometimes be desired that the operator arrange the fruit on the carriers should any disorder in the rows or layers occur. Consequently, as both hands of the operator are required to actuate the two push buttons PB, injury of the operator's hands is prevented.

The stepping switch SW, shown only in FIG. 27, and the solenoid operated valves 4b, 4c, and 5b, shown only in FIG. 26, may be located in any suitable manner on the machine, or may be disposed in a cabinet C mounted on the frame 1, it being deemed unnecessary to show other than in FIGS. 26 and 27 how the solenoid operated valves are connected to the cylinders operated thereby or how the switch SW is positioned on the frame 1.

As shown in FIGS. 1, 2, 4 and 16, the means employed for folding a pair of the bottom flaps 14b that are opposite one another on each filled carton as the latter is moved onto the roller conveyor 15, includes two sets of rods, each set consisting of rods 190, 191, and 192. These rods are disposed below the plane of the shelf 104 on which the cartons are movable, and are fixed at their forward ends to the forward end of an upwardly inclined extension 193 of the tiltable frame 11. The rods of each set are inclined downwardly and laterally outwardly beneath the shelf 104 so that when a carton is in position on the shelf to be filled, one pair of the bottom flaps 14b that are opposed to one another will be extended downwardly between each group of the rods so as to ride up on the rods when the carton is moved forwardly. The other bottom flaps 14b are positioned with one resting on the shelf 104 and the other on the extension 11b of frame 11. When the carton is moved forwardly on the shelf 104 and is being pushed onto the roller conveyor 15 as shown in FIG. 1, the bottom flaps 14b that were depending from the carton will have been moved up on top of the rods of each group so that by the time the carton starts to be pushed onto the conveyor 15, the flaps will have been folded upwardly and extended through the space between the rods and the shelf 104 sufficiently to prevent the contents of the carton from dropping therethrough. In this connection, it should be noted that the rods 190 are the longer rods, the rods 191 next in length, and the rods 192 are the shortest and that these rods are in different planes so that the upward folding of the flaps is gradual, whereby they will be moved into closing position as the carton is moved onto the roller conveyor. During the movement of the carton from over the opening 104' forwardly onto the shelf 104, the platen 110 supports the layers of fruit in the carton.

*Operation*

It should be noted that the movement of the carriers 3 and 4 between loading and unloading positions is a function of the electrically controlled components of the machine, whereas the movements of the platen 110 and the means including the parts 94, 96, and 102 for pushing the loaded carton onto the conveyor 15 are the function of manually controlled components which are put into operation at will when the operator of the machine depresses the pedal 139.

Referring now to FIG. 18 as to the positions of the carriers 3 and 4, it will be noted that the carrier 3 is in loading position over the carrier 4 and has been loaded as a result of the operation of the feed gates 19 and 20 which takes place, as hereinbefore described, upon movement of the carrier 3 into loading position. Accordingly, the gate 19 is closed and the gate 20 is lowered, as shown in FIGS. 3 and 18, and there are four rows of oranges extending across the carrier 3.

The manually operable means for tilting the carton supporting frame 11 must now be actuated to dispose the frame with a carton 14 thereon in tilted position, as shown in FIGS. 2 and 20, the carton being open at its upper and lower ends as hereinbefore described and positioned over the opening 104' in the shelf 104. This tilting of the carton supporting frame 11 is effected by depression of the lever 139 and consequent rotation of shaft 124 and the cams 150' and 151' thereon for operating the valves 150 and 151 in such sequence that the valve 150 will cause the piston and cylinder unit 111 to elevate the platen 110 into the carton to the positions shown in FIG. 2, followed by operation of valve 151 to first actuate cylinder unit 82 to tilt the frame 11 into the position shown in FIGS. 2 and 20 and then to actuate cylinder 105 to return the arms 94, 96, and member 102 from the position shown in FIG. 18 to the position shown in FIG. 20, where the members 102 are in position for subsequently pushing the carton off of the shelf 104 when the carton is filled. Having thus operated the manually operable elements of the machine to achieve the positions of elements of the machine as shown in FIGS. 2 and 20, the electrical components of the machine are now subject to operation.

Upon the operator now closing both push button switches PB (see FIG. 27), the solenoid-operated ratchet means RU moves the movable element 178 of the stepping switch SW into engagement with contact 1e, thereby closing the circuit for the solenoid 1a for the valve 2a, so that the latter directs compressed air through the line 16' into the cylinder 45' connected with the carrier 3 for moving the latter into the extended position over the carton 14, as shown in FIG. 21. When the carrier 3 reaches this extended position over the carton, the limit switch LS1 is engaged by the projection 10b on the carriage 49 for the carrier 3, thereby closing the switch LS1 and the circuit, as seen in FIG. 27, for the solenoid 5a for operating the valve 5b, it being noted that limit switch LS2 in series with switch LS1 is closed at this time by the projection 10b on the retracted carrier 4 engaging switch LS2. Accordingly, when the valve 5b is operated in this manner, air flows through line 165 to the cylinder 60 associated with the carrier 3 so that this cylinder is actuated to retract the cam member 63 to the position indicated in FIG. 5, thereby causing the lifting-lowering frame 50 to be lowered in the manner hereinbefore noted, and the carrier 3 to be disposed in the lowered or discharging position shown in FIG. 22. At the same time the carrier 3 is lowered, the valve 5 also directs air through line 165 that leads to the cylinder 60 associated with the carrier 4, whereupon this cylinder extends the cam member 63 so as to raise the frame 50 for the carrier 4 and thereby elevate this carrier to the loading position shown in FIGS. 3, 4, 5, and 24. This ends the first cycle of operation for moving the carriers 3 and 4. However, it should be noted that when the carrier 4 is elevated as above noted to loading position as shown in FIG. 22, the pins 42 thereon, as shown in FIG. 11, rock the lever 39 so as to lower the gate 20 and close gate 19 (see FIG. 22 also), thereby permitting fruit to roll onto and fill the carrier 4. The operator is now ready to effect the next operational phase of the electrical components, and upon again closing the two push button switches PB, the stepping switch SW is actuated to cause the movable contact member 178 to engage the contact 2e, thereby closing the circuit for the solenoid 2e which, as shown in FIG. 26, operates the valve 4b for forcibly directing air in this instance into cylinder 45' associated with the carrier 3, to effect a quick relative movement between the carrier and the layer of fruit thereon, whereby the latter will drop onto the platen as shown in FIGS. 23 and 24. The gate 3' on the carrier 3 is opened to release the fruit as hereinbefore explained, incident to the retraction of the carrier.

Following the second actuation of the stepping switch SW in the manner above noted, the operator depresses the pedal 139 so as to effect rotation of the shaft 124 sufficiently to move the cam 150' for actuating valve 150 to release air from the cylinder unit 111 whereby the piston 113 and the platen 110 thereon may be lowered sufficiently to accommodate the next layer of fruit to be deposited in the carton. When the air is released from the cylinder unit 112, the piston rod 111 lowers and the pawl 115, in the manner hereinbefore described, engages the first notch 119 in the rack bar 114 depending from the platen, thereby releasably holding the platen in the position shown in FIG. 6 to receive the second layer of fruit.

Following this adjustment of the platen 110, the operator again closes the push button switches PB, thereby causing the carrier 4, which has been loaded as above explained, to be extended and lowered and the carrier 3 to be retracted and elevated into loading position and loaded, in the same manner as previously described in connection with carrier 3.

These cyclical operations are continued until the carton is filled, as indicated in FIGS. 21 and 25, at which time the pedal 139 is again depressed for actuating the means for tilting the carton supporting frame 11 into the position shown in FIGS. 1 and 18. In this operation the valve 151 first directs air to cylinder unit 82 which causes the frame 11 to tilt, then directs air to cylinder unit 105 which moves the levers 94 and 96 and engaging members 102 so as to push the loaded carton onto the carrier 15, the flap-closing means consisting of the rods 190, 191, and 192 operating as hereinbefore noted, to close opposite bottom flaps 14b as the carton is moved onto the conveyor.

A modified form of this invention, as shown in FIGS. 28–33, includes in addition to the same elements shown in FIGS. 4, 5, 6, 7, 8, 9, and 10 for lowering the plate 110 to pack four layers of fruit in each carton, selectively operable lowering means which makes it possible to pack a greater or lesser number of fruit layers per carton than the first described machine shown in FIGS. 1–27. The elements for lowering the platen the same extent per operation of the pedal 138, as shown in FIGS. 4–10, are identified in FIGS. 28–33 by the same reference characters, while the elements of the selectively operable lowering means are identified by different reference characters.

In this modified form of the machine, the shaft 124 has mounted thereon for rotation therewith on opposite sides of the ratchet wheel 135, ratchet wheels 200 and 201, as shown particularly in FIGS. 31 and 33.

Also mounted on the shaft 124 for rotation therewith on opposite sides of the cam 123 are cams 202 and 203, see FIGS. 30 and 32. Cams 202 and 203 cooperate with the ratchet wheels 200 and 201, respectively, for controlling the movement of the pawl 115 which releasably engages in notches in rack bars 204 and 205 fixed to the platen 110 and depending therefrom on opposite sides of the rack bar 114. The rack bar 204 that is engaged by the pawl 115 when the ratchet wheel 200 and cam 202 are operated, has notches 204' therein spaced apart a greater distance than the notches in the rack bar 205, since the extent of lowering of the platen by the bar 204 is such that, for example, the machine will pack three layers of larger fruit than would be provided if the rack bar 114 were actuated to control the lowering of the platen. The rack bar 205 on the other hand, has its notches 205' more closely spaced than the notches in the bar 114 so that the platen 110 will be lowered, for example, an extent to accommodate five layers of smaller fruit than would be packed with the operation of rack bar 114.

The ratchet wheel 200, when actuated, will turn the shaft 124 a greater extent than when ratchet wheels 135 and 201 are actuated, and this amount of turning of the shaft 124 cause the cam 202 to control the operation of the pawl 115 suitable for contolling the lowering of the rack bar 204 according to the notches 204'. The ratchet wheel 201, when actuated, will cause the shaft 124 to be turned a lesser extent than when the ratchet wheels 135 and 200 are operated, thereby operating the cam 203 appropriately for effecting the movement of the pawl 115 to control the lowering of the rack bar 205 according to the notches 205'.

In order that the ratchet wheels 200 and 201, also the cams 202 and 203 may be selectively operated, the shaft 120' on which are mounted the arcuate arm 141 of the ratchet means 134, also the fixed arm 117, rocker member 120, lever 128 for actuating the pawl 115, is shiftable axially in the frame section 11a. This shifting of the shaft 120' will permit positioning of the pawl 115, and its operating mechanism for engaging either of the additional rack bars 204 and 205. The detent arm 148 and roller 149 thereon, also the arm 117 are mounted on a slide member 206 similar to the member 117' shown in FIGS. 4 and 5, but which is supported on the frame 11 so as to slide in either direction when the shaft 120' to which the arm 117 is fixed is shifted in the frame 11a. As a means for shifting the shaft 120', a lever 207 is pivoted as at 208 on the frame 11 and is connected by means of a link 209 with one end of the shaft, as shown in FIGS. 28 and 29. With this arrangement, when the shaft 120' as a result of manipulation of the lever 207 is moved to the left to the position shown in FIGS. 28 and 29, the slidable member 206 will be moved to the left and the detent arm 148 will be moved into position to have the roller 149 thereon engage the ratchet 200. At the same time, the arm 117 on the slide member 206 and shaft 120' and the associated operating mechanism for the pawl 115 are moved with the shaft 120' to the left so that the pawl 115 will be in position to releasably engage in the notches of the rack bar 204 to control the lowering of the platen 110. Movement of the shaft 120' to the right of the position shown in FIGS. 28 and 29, will position the roller 149 on the detent arm 148 to engage the ratchet wheel 201 and at the same time position the operating mechanism for the pawl 115 for cooperation with the cam 203, whereby the pawl 115 may be actuated to releasably engage the rack bar 205 for controlling the lowering of the platen 110.

It should be understood that whether the several mechanisms for controlling the lowering of the platen 110 are in the position shown in FIGS. 28 and 29 or the pawl 115 and the spring detent arm 148 are shifted as a result of shifting the shaft 120' as above described, each time the pedal 138 is depressed, the shaft 124 will be turned sufficiently to actuate the particular one of the ratchet wheels 135, 200 and 201 then subject to operation, also to actuate the particular one of the cams 123, 202, and 203 then subject to operation, whereby the platen 110 will be lowered according to the particular one of the rack bars 114, 204, and 205 engaged by the pawl 115.

It should also be understood that whenever the adjustments are made in the modified form of the invention for varying the lowering of the platen according to the size of the fruit being packed, it is necessary to replace the carriers 3 and 4 with carriers having gates constructed to form rows containing the amount of fruit per row as required according to the different sizes of the fruit. In addition to this, the cams 150' and 151' on the shaft 124 for operating the valves 150 and 151 should be either adjusted or changed to control the timing of the tilting of the carton supporting frame 11 and the operation of the mechanism for discharging a loaded carton, in accordance with the different degrees of rotation of the shaft 124 as effected by the different ratchet mechanisms including the ratchets 200 and 201.

While the packing machine is particularly adapted for packing fruits and vegetables of substantially uniform size, especially citrus fruit, it is to be understood that the machine may be employed to advantage for packing other objects of substantially uniform size in predetermined layers one upon the other in cartons or similar receptacles.

While specific structural details have been shown and described, it should be understood that changes and alterations may be resorted to without departing from the spirit of the invention as defined in the appended claims.

We claim:

1. In a fruit packing machine: fruit carriers each comprising a planar support for a layer of fruit; means mounting each of said carriers for movement between a first position at which a layer of fruit may be deposited on the carrier and a second position at which said layer of fruit may be discharged from the carrier; operating means for each carrier for so moving said carriers in succession; means operable upon movement of each carrier from said second position for releasing the layer of fruit from the carrier; and means beneath said second position for supporting a receptacle adapted to receive successive layers of fruit.

2. In a fruit packing machine: a pair of fruit carriers each comprising a planar support for a layer of fruit; means mounting each of said carriers for movement between a first position at which a layer of fruit may be deposited thereon and a second position at which said layer of fruit may be discharged therefrom; feed means operable in response to each carrier being moved into said first position to deposit a layer of fruit thereon and to shut off such feed upon movement of the carrier away from said first position; operating means for moving said carriers so that when one is moved into said second position the other is moved into said first position; and means for effecting discharge of said layer of fruit from each carrier upon successive movement of the carriers toward said first position from said second position.

3. A fruit packing machine as defined in claim 4, wherein said last named means includes a gate on each carrier restraining discharge of fruit when each carrier is in said second position and opening to permit discharge of fruit upon said movement of the carrier from said second position toward said first position.

4. In a fruit packing machine: a pair of fruit carriers each comprising a planar support for a layer of fruit; means mounting said two carriers for movement alternately between a loading position and a discharge position; operating means for so moving said carriers; fruit feed means operable responsive to each of said carriers reaching said loading position to feed a layer of fruit thereon and to stop such feed in response to movement of each carrier from said loading positon; and means operable when each of said carriers reaches said discharge position for actuating said operating means to effect movement of the carrier from beneath the fruit thereon so that the fruit will be discharged.

5. The fruit packing machine as set forth in claim 4 including gate means on each carrier movable between a closed position arresting discharge of fruit therefrom and an open position permitting such discharge; and means operable incident to each carrier being moved for effecting said discharge of the fruit therefrom for moving the gate means on the carrier to said open position.

6. The fruit packing machine as set forth in claim 4 wherein said mounting means for said carriers disposes the carriers in a position inclined from the horizontal whereby fruit will gravitationally roll thereon from said feed means and roll therefrom when being discharged therefrom.

7. The fruit packing machine as set forth in claim 4 including gate means on each carrier movable between a closed position arresting discharge of fruit therefrom and an open position permitting such discharge; and means operable incident to each carrier being moved to effect discharge of the fruit for moving the gate means on the carrier to said open position; said gate means for each carrier including a member extending across the carrier and having a plurality of pockets therein in which fruit is received to form a row of the fruit on the carrier.

8. In a fruit packing machine: a feed member for advancing fruit thereover; fruit carriers each having a surface for supporting fruit thereon; means mounting said carriers for movement between a loading position and a discharge position; operating means for so moving said carriers; gate means operable on said feed member responsive to movement of each carrier into said loading position to release fruit for feed onto the carrier; means operating said gate means to stop said feed of fruit in response to movement of a carrier from said loading position; and means for actuating said operating means when each carried is in said discharge position to move the carrier relative to the fruit thereon so as to discharge the fruit from the carrier.

9. In a fruit packing machine: fruit carriers each comprising a planar support for a layer of fruit; means mounting each of said carriers for movement between a first position in which a layer of fruit is deposited thereon and a second position at which said layer of fruit is discharged therefrom; operating means for supporting a receptacle in position to receive layers of fruit discharged from said carriers; means operable when each carrier is moved from said second position toward said first position to discharge fruit therefrom into said receptacle; a planar member positioned in said receptacle and spanning the same for receiving thereon the fruit discharged from said carriers; and means operable for changing the position of said fruit-receiving member in said receptacle after a carrier has discharged a layer of fruit therefrom into the receptacle.

10. In a fruit packing machine: fruit carriers each comprising a planar support for a layer of fruit; means mounting each of said carriers for movement between a first position in which a layer of fruit is deposited thereon and a second position at which said layer of fruit is discharged therefrom; operating means for supporting a receptacle in position to receive layers of fruit discharged from said carriers; means operable when each carrier is moved from said second position toward said first position to discharge fruit therefrom into said receptacle; said receptacle supporting means including a frame mounted to tilt between a position from which a loaded receptacle is movable therefrom and an inclined position for receiving fruit discharged from said carriers.

11. In a fruit packing machine: fruit carriers each comprising a planar support for a layer of fruit; means mounting each of said carriers for movement between a first position in which a layer of fruit is deposited thereon and a second position at which said layer of fruit is discharged therefrom; operating means for supporting a receptacle in position to receive layers of fruit discharged from said carriers; means operable when each carrier is moved from said second position toward said first position to discharge fruit therefrom into said receptacle; said receptacle on said supporting means being open at its upper and lower ends; a fruit receiving platen adapted to be positioned in said receptacle; means for supporting said platen for movement from a position adjacent the upper end of the receptacle to a position adjacent the lower end of the receptacle; and means for moving said platen downwardly in said receptacle after each carrier has discharged fruit therefrom.

12. In a fruit packing machine: fruit carriers each comprising a planar support for a layer of fruit; means mounting each of said carriers for movement between a first position in which a layer of fruit is deposited thereon and a second position at which said layer of fruit is discharged therefrom; operating means for supporting a receptacle in position to receive layers of fruit discharged from said carriers; means operable when each carrier is moved from said second position toward said first position to discharge fruit therefrom into said receptacle; said receptacle being mounted on said supporting means therefor and having an open lower end and bottom closure flaps depending therefrom; a member in said receptacle for supporting fruit discharged from said carriers; means for moving the receptacle from said supporting means after the filling of the receptacle; and means operable to close said flaps as said receptacle is moved from said supporting means.

13. In a fruit packaging machine: a receptacle supporting frame for supporting thereon a receptacle open at its top and bottom and provided with bottom closure flaps; means operatively associated with said frame for depositing fruit in said receptacle; means associated with said frame and disposed beneath said receptacle when said receptacle is filled for supporting said fruit therein; means cooperable with said frame for moving the receptacle with the fruit therein from said frame; and means operable upon said movement of said receptacle for closing said bottom flaps.

14. In a fruit packaging machine: a receptacle supporting frame for supporting thereon a receptacle open at its top and bottom and provided with bottom closure flaps; means operatively associated with said frame for depositing fruit in said receptacle; a platform on said frame having an opening therein over which the open bottom of said receptacle is disposed; fruit-supporting means in said receptacle on which fruit is supported above the open bottom of the receptacle; means for moving said fruit-supporting means out of said receptacle into said opening; and means for moving said receptacle away from said opening and off said platform while said supporting member is disposed in said opening.

15. In a fruit packaging machine: a receptacle-supporting frame for supporting thereon a receptacle open at its top and bottom and provided with bottom closure flaps; means operatively associated with said frame for depositing fruit in said receptacle; a platform on said frame having an opening therein over which the open bottom of said receptacle is disposed; fruit-supporting means in said receptacle on which fruit is supported above the open bottom of the receptacle; means for moving said fruit-supporting means out of said receptacle into said opening; means for moving said receptacle away from said opening and off said platform while said supporting member is disposed in said opening; and means on said frame for engaging said bottom flaps and moving said flaps to close said open bottom of said receptacle during movement off said platform.

16. In a fruit packing machine: a frame; a feed platform inclined in said frame to receive fruit at one end and gravitationally direct fruit therefrom at the other end; fruit carriers; means mounting each of said fruit carriers for movement between a first position for receiving fruit from said platform and a second position at which fruit may be discharged therefrom; an upper gate on said platform movable between a closed position for restraining fruit from entering the platform and an open position which will permit fruit to enter the platform; a lower gate on said platform movable between a closed position restraining fruit from gravitating onto said carriers and an open position permitting said gravitational movement of the fruit from said platform; and means for moving said upper and lower gates between said positions operable in response to said movements of said carriers.

17. In a packing machine: a frame; a pair of fruit carriers each comprising a planar support for a layer of fruit; means mounting said carriers on said frame for movement into and from positions in which one carrier is in a loading position overlying the other carrier for receiving a layer of fruit thereon; operating means operable for effecting successive movements of said carriers, in a first stage of movement wherein said one carrier is moved forwardly from said loading position to a first position, in a second stage of movement, wherein both carriers are moved so that said one carrier is lowered to a second position at which said layer of fruit may be dischraged therefrom and said other carrier is elevated into said loading position, and in a third stage of movement wherein said one carrier is retracted to a position beneath said other carrier; and means operable upon said retraction of the carriers for releasing the fruit therefrom.

18. A packing machine as defined in claim 21, including a first control means manually operable to effect operation of said operating means to move said carriers according to said first and third stages; and a second control means operable in response to movement of said one carrier into said first position for effecting said second stage movements of said carrier.

19. In a packing machine: a frame; a pair of fruit carriers each comprising a planar support for a layer of fruit; means mounting said carriers on said frame for movement one at a time into and from a loading position in which one carrier overlies the other and is adapted to have a layer of fruit deposited thereon; operating means for moving the upper carrier with the layer of fruit thereon forwardly to a second position; means operating in response to said upper carrier reaching said second position to lower said upper carrier to a position from which the layer of fruit thereon may be discharged and to elevate said other carrier to said loading position; means for actuating said operating means to retract said lowered carrier to a position beneath said elevated carrier; and means operating in response to said retraction of said lowered carrier to release said layer of fruit therefrom for discharge into a receptacle.

20. The packing machine as set forth in claim 19 including means operable responsive to each of said carriers being moved into said loading position for feeding successive layers of fruit on the carrier.

21. The packing machine as set forth in claim 19 including feeding means operable in response to each carrier being moved into said loading position to feed successive layers of fruit onto the carrier and operable to shut off such feed on movement of each carrier from said loading position.

22. In a packing machine: a frame; a pair of fruit carriers each comprising a planar support for a layer of fruit; means mounting said carriers for movement one at a time into and from loading position in which one carrier is inclined from the horizontal and disposed over the other carrier; feed means operable to gravitationally feed a layer of fruit onto each carrier reaching said loading position and to stop such feed upon movement of the carrier from loading position; operating means for said carriers operable to move the upper carrier forwardly to a second position; means operating in response to said upper carrier reaching said second position to elevate said other carrier into said loading position and to lower said upper carrier to a position from which it may be moved for releasing fruit therefrom; means for effecting operation of said operating means to retract said lowered carrier to a position beneath the elevated carrier; and means operable to release said layer of fruit from said lowered carrier incident to said retraction thereof.

23. In a packing machine comprising means for supplying a plurality of articles arranged in rows to a discharge location; means for receiving said articles; and carrier means comprising a planar member for supporting a layer of said articles and for transporting said articles from said discharge location to said receiving means; the improvement wherein said receiving means has a surface inclined from a horizontal plane and wherein said carrier member is also inclined relative to a horizontal plane and is provided with retractible means for retaining said articles on said carrier means member during movement of the latter from said discharge location to said receiving means; and means for retracting said retractable means and moving said carrier member from beneath said articles, whereby the latter are permitted to progressively gravitate in rows from said carrier member to said inclined surface of said receiving means.

24. A packing machine, comprising: a supporting framework having means for supporting a receptacle open at top and bottom on an incline; platen means movable longitudinally within said receptacle for supporting layers of fruit as the same are supplied to said receptacle; means for progressively moving said platen downwardly in said receptacle as successive layers of fruit are placed on said platen; means for placing successive layers of fruit on said platen including carrier means and means for supplying successive layers of fruit to said carrier means; said carrier means comprising a pair of planar members having means thereon for retaining a layer of fruit and for allowing discharge of said layer of fruit into said receptacle onto said platen; and means for successively moving said carrier members between said supply means and said receptacle for placing said successive layers of fruit on said platen.

References Cited
UNITED STATES PATENTS

| | | | |
|---|---|---|---|
| 2,632,552 | 3/1953 | Coons | 146—51 |
| 2,836,946 | 3/1958 | Schroeder | 53—163 |

FRANCIS S. HUSAR, *Primary Examiner.*

UNITED STATES PATENT OFFICE
CERTIFICATE OF CORRECTION

Patent No. 3,324,623                      June 13, 1967

Maurice V. Johnson, Jr., et al.

It is hereby certified that error appears in the above numbered patent requiring correction and that the said Letters Patent should read as corrected below.

Column 15, line 63, for the claim reference numeral "4" read -- 2 --; column 18, line 34, for the claim reference numeral "21" read -- 17 --.

Signed and sealed this 20th day of August 1968.

(SEAL)
Attest:

Edward M. Fletcher, Jr.
Attesting Officer

EDWARD J. BRENNER
Commissioner of Patents